United States Patent
Sighinolfi (10) Patent No.: US 11,014,266 B2
(45) Date of Patent: May 25, 2021

(54) CUTTING SYSTEM FOR SLABS

(71) Applicant: RAIMONDI S.P.A., Modena (IT)

(72) Inventor: Riccardo Sighinolfi, Rubiera (IT)

(73) Assignee: RAIMONDI S.P.A., Modena (IT)

( * ) Notice: Subject to any disclaimer, the term of this patent is extended or adjusted under 35 U.S.C. 154(b) by 112 days.

(21) Appl. No.: 16/007,053

(22) Filed: Jun. 13, 2018

(65) Prior Publication Data

US 2018/0361621 A1 Dec. 20, 2018

(30) Foreign Application Priority Data

Jun. 15, 2017 (IT) ......................... 102017000066629

(51) Int. Cl.
| | |
|---|---|
| *B28D 7/04* | (2006.01) |
| *B28D 1/22* | (2006.01) |
| *C03B 33/12* | (2006.01) |
| *C03B 33/03* | (2006.01) |
| *C03B 33/023* | (2006.01) |

(52) U.S. Cl.
CPC .............. *B28D 7/04* (2013.01); *B28D 1/225* (2013.01); *B28D 1/228* (2013.01); *B28D 7/046* (2013.01); *C03B 33/023* (2013.01); *C03B 33/03* (2013.01); *C03B 33/12* (2013.01); *B65G 2249/04* (2013.01)

(58) Field of Classification Search
CPC .......... B28D 1/225; B28D 1/228; B28D 7/04; B28D 7/046; B65G 2249/04; C03B 33/023; C03B 33/03; C03B 33/01
USPC ................... 83/614, 745; 33/32.1, 32.2, 32.3
See application file for complete search history.

(56) References Cited

U.S. PATENT DOCUMENTS

| | | | | |
|---|---|---|---|---|
| 2,277,415 A | * | 3/1942 | Ruppert, Jr. ............. | A01G 3/06 172/16 |
| 3,198,044 A | | 8/1965 | Bernard | |
| 3,460,418 A | * | 8/1969 | Boothe, Jr. .............. | A24C 5/28 83/168 |
| 3,540,166 A | * | 11/1970 | Crumley .................. | B24B 3/46 451/420 |
| 3,566,736 A | * | 3/1971 | Johnson ............. | A61B 5/04023 83/510 |
| 3,735,445 A | * | 5/1973 | Jurcak .................... | A22C 29/00 452/6 |
| 3,821,916 A | * | 7/1974 | Ricci ...................... | B26D 1/547 83/200.1 |

(Continued)

FOREIGN PATENT DOCUMENTS

| | | |
|---|---|---|
| DE | 1421792 A1 | 10/1968 |
| JP | 0840739 A | 2/1996 |
| WO | 2006/057024 A1 | 6/2006 |

*Primary Examiner* — Ghassem Alie
(74) *Attorney, Agent, or Firm* — Browdy and Neimark, PLLC (57) ABSTRACT

A cutting system for slabs which includes a longitudinal guide having a pair of surfaces opposite to each other, the pair made up of a lower surface and an opposite upper surface, a suction cup coupled to the lower surface of the longitudinal guide suitable to selectively adhere to a slab and defining a contact surface of the longitudinal guide on the slab, the longitudinal guide further including a pair of rails parallel to each other coupled to the upper surface of the longitudinal guide and suitable for slidably coupling to a scoring slider. The rails are arranged on opposite sides with respect to a median plane of the suction cup perpendicular to the contact surface thereof.

13 Claims, 5 Drawing Sheets

(56) References Cited

U.S. PATENT DOCUMENTS

| | | | | |
|---|---|---|---|---|
| 4,088,049 A * | 5/1978 | Benedict | B26D 1/18 | 83/240 |
| 4,187,755 A * | 2/1980 | Shirai | C03B 33/027 | 83/487 |
| 4,224,854 A * | 9/1980 | Malacheski | B23Q 9/0014 | 83/455 |
| 4,307,643 A * | 12/1981 | Diegel | B26D 3/085 | 33/32.3 |
| 4,324,514 A * | 4/1982 | Craven | B23C 1/20 | 33/23.11 |
| 4,951,539 A * | 8/1990 | Buckner | B26D 3/065 | 83/522.17 |
| 5,095,792 A * | 3/1992 | Moody | B01L 99/00 | 83/167 |
| 5,243,890 A * | 9/1993 | Ober | B26D 1/205 | 83/471.2 |
| 5,423,238 A * | 6/1995 | Bory | B26D 1/045 | 269/47 |
| 5,560,274 A * | 10/1996 | Turner | B28D 1/225 | 125/23.02 |
| 5,681,022 A * | 10/1997 | Rankin | F16B 47/00 | 248/205.9 |
| 5,697,413 A * | 12/1997 | Fuller | B23Q 33/00 | 144/135.2 |
| 5,735,512 A * | 4/1998 | Waddell | B25B 11/005 | 269/21 |
| 6,210,084 B1 * | 4/2001 | Banks | B21J 15/10 | 29/34 B |
| 6,269,994 B1 * | 8/2001 | Harrington | B28D 1/225 | 125/23.02 |
| 6,298,561 B1 * | 10/2001 | Decker | B26B 29/06 | 30/265 |
| 6,467,385 B1 * | 10/2002 | Buttrick | B23D 45/003 | 29/897.2 |
| 6,843,328 B2 * | 1/2005 | Boyl-Davis | B23Q 1/26 | 173/31 |
| 7,137,760 B2 * | 11/2006 | Boyl-Davis | B23B 39/14 | 408/1 R |
| 7,264,426 B2 * | 9/2007 | Buttrick, Jr. | B23B 35/00 | 408/1 R |
| 7,273,333 B2 * | 9/2007 | Buttrick, Jr. | B23Q 9/0042 | 408/1 R |
| 7,406,758 B2 * | 8/2008 | Jones | B23Q 9/0014 | 248/205.5 |
| 7,488,144 B2 * | 2/2009 | Boyl-Davis | B23B 39/14 | 408/1 R |
| 8,393,834 B2 * | 3/2013 | Brugman | B23Q 9/0042 | 144/144.1 |
| 9,061,440 B2 * | 6/2015 | Baro Cabrero | C03B 33/107 | |
| 9,067,339 B2 * | 6/2015 | Mallet | B28D 1/228 | |
| 9,186,763 B2 * | 11/2015 | Weidman | B23Q 1/01 | |
| 9,789,622 B2 * | 10/2017 | Paulson | B26D 1/245 | |
| 2004/0177738 A1 * | 9/2004 | Mori | B26D 1/185 | 83/563 |
| 2013/0134201 A1 * | 5/2013 | Mallet | B28D 1/228 | 225/2 |
| 2014/0165989 A1 * | 6/2014 | Baro Cabrero | B28D 1/24 | 125/23.02 |

\* cited by examiner

CUTTING SYSTEM FOR SLABS

TECHNICAL FIELD

The present invention relates to the sector of machining of large-format slab-shaped elements, such as tiles, sheets of glass or the like, which are generally made from fragile or brittle fracture material. In detail, embodiments of the present invention relate to a slab cutting system, e.g., such as ceramic slabs.

BACKGROUND ART

As is known, hard and brittle fracture materials such as ceramics or glass are widely used in the realisation of buildings (e.g., as surface coverings) or other products. Such materials are usually produced as slabs of various sizes which can be cut in order to form different formats than the starting ones.

In the case of flooring coverings or wall coverings, the use of ceramic materials is widespread for aesthetic reasons, good wear resistance and ease of maintenance thereof.

Alongside the more common tiles in ceramic material available in various standardised formats, large-format slabs have recently been developed (e.g., with a size of the order of the metre), hereinafter for the sake of brevity to be referred simply as slabs.

In detail, portions of the required length/width are obtained from a slab through cutting systems designed to make a cut in (or at least a score in) the slab itself.

Given the dimensions of the slabs to be cut, the cutting systems usually comprise a rectilinear longitudinal guide which is arranged on the surface of the slab to be cut, and a scoring slider coupled to the longitudinal guide in a mobile fashion is made to slide along the guide, while a cutting portion of the scoring slider is kept in contact with the surface of the slab. In this way, it is possible to make a long, rectilinear cut in the slab.

An important requirement in these cutting systems is the need to prevent displacements (even of small entity) of the guide while the slider is being moved along it to make the cut, in other words after the stable positioning of the guide on the slab.

In order to satisfy this need, the state of the art has made use of gaskets and/or suction cups applied at various points of the longitudinal guide in order to allow stable coupling between the longitudinal guide and the slab during the cutting operation.

However, even when solidly engaged on the surface of the slab, these measures are not always able to entirely and effectively contrast stresses on the longitudinal guide exerted by the scoring slider during the slab cutting operation. In particular, a pressure exerted on the cutting portion of the scoring slider in order to make the score is sometimes able to create torsional stresses such as to move the longitudinal guide during the scoring operation and thus wreck the cutting process.

An example of known cutting systems is shown in Japanese patent no. JP H08 40739.

In this system the scoring slider is engaged on a track made up of a pair of rails which—when engaged by the slider—are arranged on the same side as the median plane of the suction cups orthogonal to the contact plane thereof; as such, (vertical) pressure exerted on the slider in order to perform the scoring translates into a torque on the suction cups, which tend to detach from the surface they are engaged on.

It is an object of the present invention to overcome these shortcomings of the prior art, within a simple, rational and low-cost solution.

These objects are achieved by the characteristics of the invention set forth in the independent claim. The dependent claims illustrate the preferred and/or particularly advantageous aspects of the invention.

DISCLOSURE OF THE INVENTION

The invention, specifically, provides a slab cutting system. The cutting system comprises: a scoring slider, a longitudinal guide comprising a pair of surfaces opposite to each other, of which a lower surface, which is adapted to face the slab being worked, and an opposite upper surface, which upper surface is equipped with a pair of rails parallel to each other and suitable for (simultaneously) slidably coupling to the scoring slider; at least one suction cup coupled (e.g., rigidly engaged on) to the lower surface of the longitudinal guide, preferably aligned in plan view with the lower (and upper) surface of the longitudinal guide itself, which suction cup is suitable to selectively adhere to a (surface of a) slab and defines a substantially planar contact surface for the longitudinal guide on the (surface of the) slab, in which the rails are arranged on opposite sides with respect to a median plane of the suction cup itself (parallel to a longitudinal axis of the longitudinal guide) and, for example, parallel (and coinciding with) a median axis of the longitudinal guide.

Thanks to this solution, a better distribution of the mechanical stresses applied to the cutting system is achieved such as to eliminate, or at least attenuate, changes in the orientation of the longitudinal guide which could lead to irregular scoring or compromise the surface of the slab.

In particular, the angular momentum which is discharged on the longitudinal guide due to the pressure applied to the scoring slider when making the longitudinal scoring incision on the slab, during its travel along the longitudinal guide, is significantly less than known cutting systems, thanks to the arrangement of the pair of rails to which the scoring slider engages with respect to the median plane of the suction cup.

In one embodiment of the present invention, the rails are parallel to the median plane of the suction cup, e.g. parallel to a longitudinal axis of the longitudinal guide.

In this way, an even better distribution of the mechanical stresses applied to the cutting system i achieved.

In one embodiment of the present invention, the suction cup is comprised in a gripping component, the gripping component comprising a lever operatable to switch the suction cup from a slab gripping condition to a rest condition in which it releases the slab; said lever being exposed on the upper surface of the longitudinal guide between the parallel rails.

In this way, a compact cutting system is achieved in which the suction cup can be constrained to or released from the slab in a fast, simple manner.

In one embodiment of the present invention, the lever of the gripping component is rotatable from an engaged position which imposes the gripping condition of the suction cup to a released position which imposes the rest condition of the suction cup; the lever in the engaged and released position being parallel to the longitudinal guide.

In this way, the lever has an extremely limited encumbrance in the engaged and released position along a vertical direction (orthogonal to the lower surface) of the cutting system. In practice, thanks to this solution the lever allows the sliding of the slider both when the suction cups are in the gripping condition and when they are in the rest condition, with doubtless advantages for the cutting personnel.

In one embodiment of the present invention, the scoring slider comprises at least two rollers each suitable to rotate on one rail of the pair of rails, a scoring component suitable to score the slab, and a slider body coupled to the rollers and to the scoring component.

Preferably, the slider body defines an opening when the scoring slider is coupled to the rails via the rollers, the opening being suitable to receive the lever of the gripping component in the engaged or released position during the sliding of the scoring slider along the longitudinal guide.

In this way, the possibility to move the scoring slider freely along the longitudinal guide is achieved.

In one embodiment of the present invention, the slider body comprises two flanges spaced apart from each other, in which each flange is suitable to be coupled to at least one roller and in which at least one flange allows to adjust a coupling position of one roller in a direction which connects the two flanges.

In this way, the possibility to finely adjust the coupling between the rollers of the scoring slider and the rails of the longitudinal guide is achieved, i.e. it is possible to couple and decouple the scoring slider to/from the rails of the longitudinal guide, e.g. by moving the opposite rollers together or apart with respect to the pair of rails.

In one embodiment of the present invention, the scoring component of the scoring slider comprises a handgrip, a rod, and a scoring wheel, the scoring wheel being coupled in a rotatable manner to a first end of the opposite rod and to a second end to which the handgrip is coupled.

For example, the rod comprises a hole at the first end and in which a cleaning and/or lubricating element is installed in the hole, the cleaning and/or lubricating element contacting a portion of the scoring wheel facing the rod in order to remove foreign bodies present on said portion of the scoring wheel and/or release a lubricant onto the scoring wheel.

In this way, continual removal of impurities and foreign bodies from the scoring wheel, as well as lubrication thereof and therefore scoring of improved quality, is achieved.

In one embodiment of the present invention, the rollers each have a revolution axis orthogonal to the lower surface of the longitudinal guide, and are suitable for rolling (without brushing) on the respective rail, e.g. on opposite sides of the same.

In an alternative embodiment of the present invention, the rollers each have a revolution axis orthogonal to the lower surface of the longitudinal guide, and are suitable for rolling (without brushing) on the respective rail, e.g. from mutually facing sides thereof.

In one embodiment of the present invention, the rollers each have a revolution axis parallel to the lower surface of the longitudinal guide and orthogonal to the said median plane of the suction cups, and are suitable for rolling (without brushing) on the respective rail, e.g. on the side thereof opposite to the lower surface.

BRIEF DESCRIPTION OF THE DRAWINGS

Further characteristics and advantages of the invention will become apparent from the reading of the following description provided as a non-limiting example, with the aid of the figures illustrated in the attached tables.

BEST MODE FOR CARRYING OUT THE INVENTION

Referring to FIGS. 1-6 a cutting system 10 has been shown for ceramic slabs in accordance with a preferred embodiment of the present invention.

The cutting system 10 globally comprises a longitudinal guide 20 on which a scoring slider 30 is slidably coupled and one or more gripping components 40 (three partially visible in the example illustrated in FIG. 1) coupled to the longitudinal guide 20 and suitable to constrain the cutting system 10 to a slab 50 (as described below).

Figure 1:
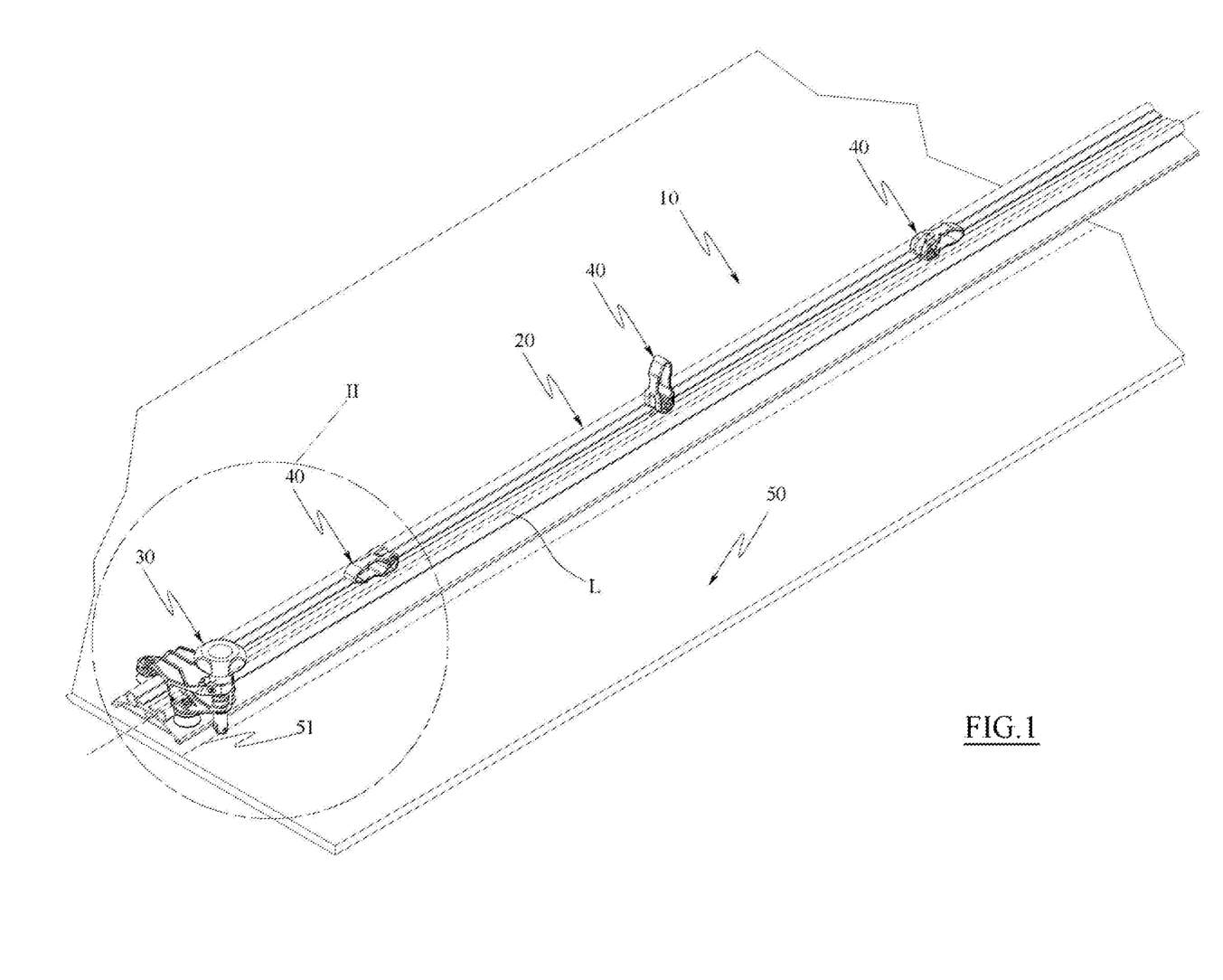
FIG. 1 is an axonometric view of a cutting system according to one embodiment of the present invention placed on a slab to be cut.
Figure 2:
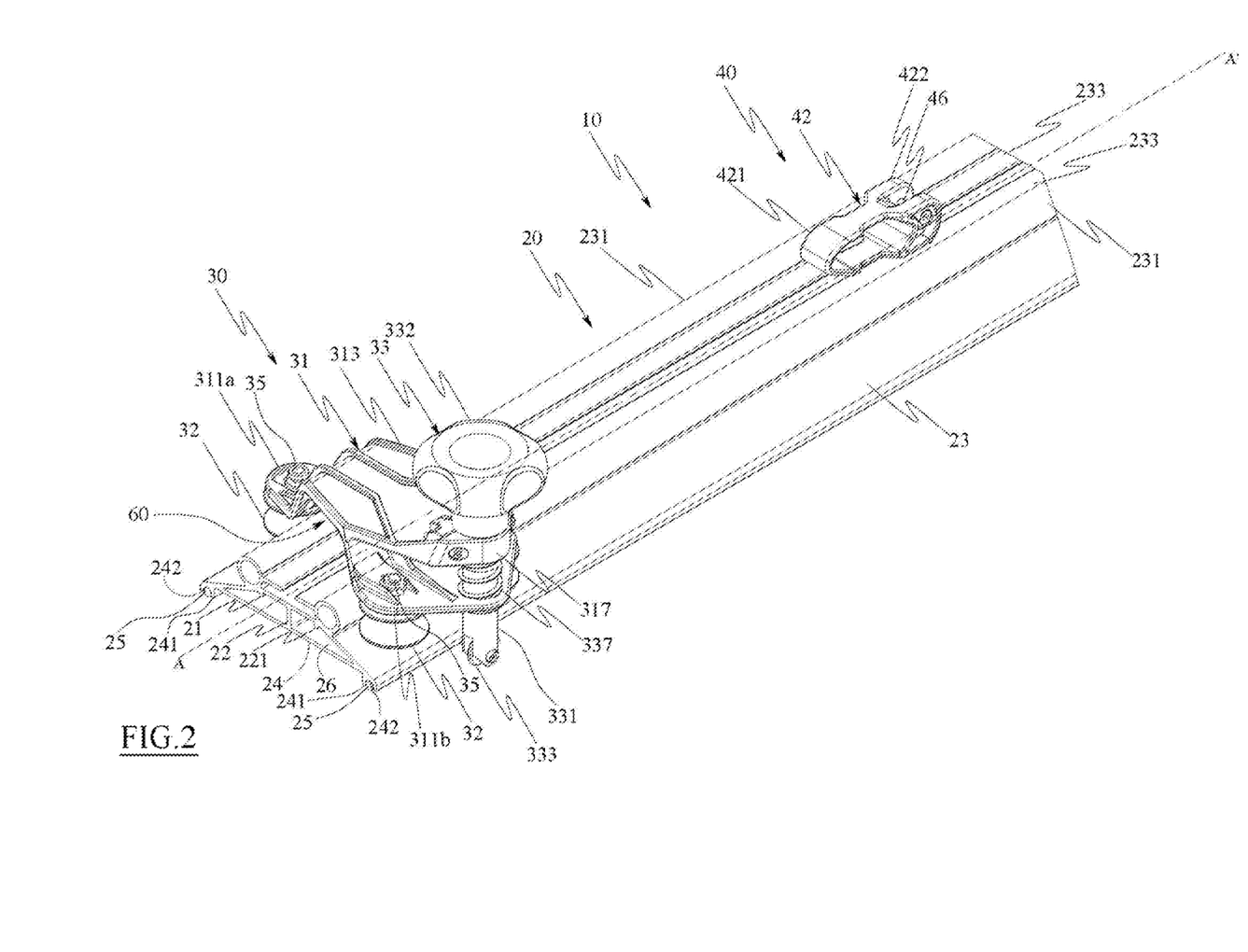
FIG. 2 is an enlarged view of detail II of FIG. 1.

The slab 50 may be a tile, a sheet of glass or the like, preferably of large-format, e.g. the slab 50 has a size essentially between 3-3.5 metres×1-1.5 metres.

The longitudinal guide 20 has a substantially rectangular shape in plan view, with a length substantially greater than a width.

The longitudinal guide 20 is defined by a long, thin side member (e.g. obtained by extrusion, i.e. presenting a constant cross section for its entire longitudinal extent) defining an upper (free) surface and an opposite lower surface intended to face a surface of the slab 50 (indirectly resting on it), specifically, the visible surface of the slab 50, in other words the surface of the slab 50 which, once placed for processing, will be visible.

In the embodiment in question, the longitudinal guide 20 has a substantially trapezoidal cross section (as can be more clearly appreciated in FIGS. 3 and 5), preferably that of an isosceles trapezium.

It is not excluded, however, that the longitudinal guide 20 can have a cross section of any shape, depending on needs.

Advantageously, although not as a limitation, the longitudinal guide 20 may also comprise structural strengthening elements such as one or more ribs 21 and/or one or more septa 22.

The longitudinal guide 20 incorporates a (first) upper surface 23 (preferably comprising a smaller base and inclined sides of the trapezoidal section), and an opposite (second) lower surface 24 (preferably comprising a larger base of the trapezoidal section).

Preferably, the lower surface 24 comprises a supporting portion 241, preferably flat (planar), which defines a plane which is intended to rest (although not directly) on the visible surface of the slab 50, copying its planar profile. In practice, the lower surface 24 is destined, in use, to be directed towards and face the visible surface of the slab 50.

Advantageously, an edge portion of the lower surface 24 comprises a housing 242, fully developed with respect to the longitudinal guide 20, for a gasket 25 (e.g., a component made from elastomeric material). Preferably, the housing 242 is supplied at least along a pair of longitudinal edges of the lower surface 24 which overall define a planar surface intended to rest via the gasket 25 on the visible surface of the slab 50.

In practice, the longitudinal edges define the support portion 241, i.e. the portion of the longitudinal guide 20 proximal to the slab 50 or, in other words, the portion of the longitudinal guide 20 distal from the top of the longitudinal guide 20 defined by the upper surface 23.

The housing 242 is designed in such a way that a portion of the gasket 25, which is housed within it, protrudes transversely (towards the slab 50) with respect to the lower surface 24 of the longitudinal guide 20. In this way, when the gasket 25 contacts the slab 50 below it, the cutting system 10 rests stably on the gasket 25, offering good resistance to friction (which the cutting system 10 is typically subject to in use) on the visible surface of the slab 50. Moreover, the gasket 25 prevents direct contact between the longitudinal guide 20 and the slab 50 below it, thus preventing compromise to the slab 50 (e.g., formation of scratches) due to friction between the latter and the longitudinal guide 20.

The gasket(s) 25 define a de-facto (soft and/or resilient) contact plane of the longitudinal guide 20 on the visible surface of the slab 50.

Each gasket 25 is defined by a substantially cylindrical (elastically deformable) body of length substantially equal to the length of the longitudinal guide 20.

A pair of rails 231 are formed by the upper surface 23. The rails 231 are parallel and extend along a longitudinal direction L of the longitudinal guide 20, i.e. parallel to the median axis A-A' of the longitudinal guide 20 (parallel to the longitudinal axis of the longitudinal guide 20 itself).

The rails 231 extend longitudinally for the entire length of the longitudinal guide 20.

The rails 231 define a de-facto track on which, as will be better described below, the scoring slider 30 slides.

Advantageously, the rails 231 are equidistant from the median axis A-A' of the longitudinal guide 20, i.e. from the median plane of the longitudinal guide orthogonal to the contact plane of the longitudinal guide 20 with the slab 50.

As specified, the cutting system 10 comprises one or more gripping components 40.

Each gripping component 40 comprises at least one suction cup 41.

The suction cup 41 is sized so as to constrain, at least locally and/or temporarily, the longitudinal guide 20 to the slab 50 when in the gripping configuration with the visible surface of the slab 50 itself.

The suction cup 41 is fastened to the lower surface 24 of the longitudinal bar 20 as will be described in detail below.

The suction cup 41 offers a substantially planar contact surface facing the opposite direction with respect to the longitudinal bar 20 (i.e. to the lower surface thereof), which overall defines a contact plane intended to rest against the (visible) surface of the slab 50 during use of the cutting system 10.

The contact surface of the suction cup 41 is, de facto, the surface thereof distal from the longitudinal guide 20 (e.g., protruding slightly below the contact plane defined by the longitudinal edges of the lower surface 24).

The longitudinal guide 20 de facto rests on the (visible) surface of the slab 50 via the suction cup 41, i.e. via the contact surface of the suction cup itself.

At the same time, the suction cup 41 is sized so as to be comprised in the encumbrance in plan view of the longitudinal guide 20. In the implementation under consideration, the suction cup 41 is comprised between the guide portions of the lower surface 24.

For example, the suction cup 41 has a substantially discoidal shape, and preferably a substantially trapezoidal cross section. As a consequence, the suction cup 41 comprises a larger surface 411 opposite to a smaller surface 413.

In detail, the suction cup 41 is arranged with the larger surface 411 resting on/facing the lower surface 24 (i.e., the contact portion 241) of the longitudinal guide 20, while the smaller surface 413 is facing the slab 50 being worked and is suitable to (entirely or partially) rest on the visible surface of the slab 50 (i.e., the smaller surface 413 of the suction cup 41 lies on the visible surface of the slab 50) defining the contact surface of the longitudinal guide 20 on the slab itself.

The cutting system 10 comprises multiple suction cups 41 fastened to the longitudinal guide 20 along the longitudinal axis thereof, e.g. all aligned along such longitudinal axis, and in which all the contact surfaces of the suction cups 41 are coplanar.

Each suction cup 41 is associated with the longitudinal guide 20 in such a way that a respective central point thereof is comprised in a plan projection of the rails 231.

Preferably, median planes of the suction cups 41 orthogonal to the contact surface of the suction cups 41 are mutually aligned. Even more preferably, a median plane of each suction cup 41 is aligned with the median axis A-A' of the longitudinal guide 20. In other words, the median axis A-A' of the longitudinal guide 20 lies on the median plane of the suction cups 41 (and coincides with them).

In the solution in accordance with embodiments of the present invention, the rails 231 of the pair of rails 231 are arranged on opposite sides with respect to the median planes of the suction cups 41 perpendicular to the contact surface of the suction cup 41 (of each of them), i.e., perpendicular to the visible surface of the slab 50 and, therefore, parallel to the median axis A-A' of the longitudinal guide 20 (i.e., to its longitudinal direction L).

Each suction cup 41 is mainly defined by a deformable membrane which defines the contact surface of the suction cup itself.

Moreover, the suction cup 41 can be defined by a vacuum chamber, e.g. bell-shaped, which—as in the example illustrated—is defined integral with the longitudinal bar 20, e.g. implemented through a circular opening (through or blind) made in the lower surface 24.

It is not excluded, however, that the vacuum (or bell-shaped) chamber may be a separate body from the longitudinal guide 20, e.g. fastened thereto at the lower surface 24.

Preferably, the rails 231 are formed in a single body with the longitudinal guide 20. In the embodiments illustrated in the Figures, the rails 231 are substantially formed as hollow cylinders. This rail shape should not, however, be taken as limiting; for example, rails with a substantially C-shaped cross section can be implemented in alternative embodiments (not shown) of the cutting system in accordance with the present invention.

The two rails 231 delimit a region 232 of the upper surface 23.

In the embodiment in question, two supporting portions 233 extend in a cantilever fashion from the rails 231 towards the median axis A-A' of the region 232. Preferably, the support portions 233 delimit an opening (or through hole) 234 corresponding to the median axis A-A' of the longitudinal guide 20. Preferably, the support regions 233 extend longitudinally for the entire length of the longitudinal guide 20.

The support portions 233 are provided to support a lever 42, for example a cam lever, for each gripping component 40, while the opening 234 allows the passage of a transmission element, for example a stem 43, for each gripping component 40.

In greater detail, each gripping component 40 comprises one said suction cup 41 and a lever 42, interconnected by a stem 43. Preferably, although not as a limitation, each adhesion assembly further comprises a spring 44, preferably a helicoidal spring.

The suction cup (i.e., the deformable membrane) 41 is rigidly coupled to a first end of the stem 43. For example, the first end of the stem 43 is anchored to the suction cup 41, e.g., via a tucked-in closure (snap-on) system with a first end (not shown) of the stem 43 which is received by a corresponding housing (not shown) formed in the suction cup 41, or via another method; for example, in an alternative embodiment, a terminal section of the stem may be buried in the suction cup 41.

Conversely, the lever 42 is coupled to a second end of the stem 43 in a rotating fashion, e.g., with respect to a rotation axis orthogonal to the median plane of the suction cups parallel to the longitudinal axis of the longitudinal guide 20 and orthogonal to the lower surface thereof. In the embodiment in question, the stem 43 is hinged on the lever 42 via a pin 46 (e.g., formed from a nut and bolt pair) transversely arranged with respect to the stem 43 and, preferably, with respect to the longitudinal direction L of the longitudinal guide 20.

The second end of the stem 43 comprises a through hole (not visible in the Figures) suitable to rotatingly receive the pin 46.

In the embodiment in question, the lever 42 comprises a handle 421, suitable to be gripped by a user of the cutting system 10, and two rotation portions 422 which extend parallel in a direction opposite to that of the handle 421, spaced apart in such a way as to define an indentation suitable to receive the stem 43.

Preferably, each rotation portion 422 has a free end having a rounded/semi-flattened profile such as to facilitate a switching operation of the lever 42.

Each rotation portion 422 comprises a through hole 423 suitable to receive the pin 46. The through holes 423 are coaxial to each other and eccentrically arranged with respect to the rotation portions 422 (e.g., at a predetermined distance with respect to a median plane of the rotation portions 422), in such a way as to convert a rotary movement of the lever 42 into a rectilinear movement of the stem 43. This movement of the stem 43 is able to switch the suction cup 41 from a rest condition to the gripping condition, and vice versa.

Moreover, the stem 43 slidably passes through the opening 234 between the support portions 233 and one or more coaxial through holes (not shown) formed in the longitudinal guide 20 (and, where applicable, in the septum 22) formed to receive the stem 43. In one embodiment of the present invention, the stem 43 passes through the longitudinal guide 20 and engages with the suction cup 41 (in particular with the deformable membrane) in such a way as to guarantee that a central region (preferably at the centre of a suction cup in circular plan view) is aligned along the median axis A-A' of the longitudinal guide 20.

Finally, the spring 44 is preferably housed in an internal cavity 26 of the longitudinal guide 20 (below the upper surface 23 and above the lower surface 24 of the longitudinal guide 20).

In one embodiment of the present invention, a lower end 441 of the spring 44 is rigidly coupled to the stem 43, while an upper end 442 of the spring 44 is abutting against an internal face of the longitudinal guide 20 below the upper surface 23. The spring 44 is preferably coaxially arranged with the stem 43, specifically with the stem 43 being surrounded by the coils of the spring 44.

In this way, the spring 44 is compressed during an upward movement of the stem 43 (i.e., with a direction of movement proceeding from the lower surface 24 towards the upper surface 23 of the longitudinal guide 20) associated with a movement of the corresponding lever 42 from a released position R, in which the pin 46 is proximal to the support portions 233 (and the suction cup 41 is in the rest condition), to an engaged position I, in which the pin 46 is distal from the support portions 233 (in which the suction cup 41 is in the gripping condition), passing through a series of intermediate positions such as the median position M, in which the lever 42 is transverse to the support portions 233 (as described in greater detail below).

In brief, each gripping component 40 is associated with the longitudinal guide 20 with the lever resting on the support portions 233 inside the rails 231, while the stem 43 passes through the opening 234 between the support portions 233 and transversely passes through the entire longitudinal guide 20, coupling with the suction cup 41, which (even only partially) protrudes from the lower surface 24 of the longitudinal guide 20 from the opposite side with respect to the upper surface 23.

As specified above, the cutting system 30 comprises also a scoring slider 30.

The scoring slider 30 comprises a slider body 31, two or more rollers 32, for example three rollers 32 as shown in the Figures, and a scoring component 33.

The slider body 31 comprises flanges 311, two flanges 311a and 311b in the embodiment shown in the Figures, designed to allow a coupling between the rollers 32 and the slider body 31. In detail, each flange 311 comprises at least one arrangement suitable for coupling with a roller 32.

For example, the flange 311a comprises a through hole 312 (visible in a sectional view in FIG. 5), while flange 311b comprises a pair of through holes 312. Each through hole 312 is designed to receive a rotation pin 34 associated with a relative roller 32 (as described below). Each rotation pin 34 defines an axis of rotation of the roller 32 with which it is associated. In other words, a longitudinal axis of the generic rotation pin 34 corresponds to the rotational axis of the roller 32 associated with that rotation pin 34.

In the illustrated embodiment, the flange 311a allows the coupling with a roller 32, while the flange 311b allows the coupling with two rollers 32. In this way, three rollers define a sliding plane for the scoring slider 30 along the longitudinal guide 20 (corresponding to the plane defined by the rails 231). In order to ensure better distribution of the weight and the forces applied to the scoring slider 30 and transmitted to the longitudinal guide 20, the rollers 32 are, advantageously, arranged on the slider body 31 in such a way that they correspond to the vertices of an equilateral or isosceles triangle.

Preferably, at least one through hole 312 will allow receiving the rotation pin 34 of the corresponding roller 32 to be received in two or more distinct positions, thus allowing to adjust a distance/between the rollers 32 associated with different flanges 311a and 311b. For example, the single through hole 312 formed in flange 311a may have an oblong shape in one direction which connects the two flanges 311a and 311b, in such a way as to allow coupling the rotation pin 34 in different positions along that direction, so as to adjust the distance between the roller 32 coupled to flange 311a and the pair of rollers 32 coupled to flange 311b. In this way, it is possible to perform an adjustment of the slidable coupling between the rollers 32 and the rails 231, and decouple the scoring slider 30 from the longitudinal guide 20 without extracting the scoring slider 30 from one of the ends of the longitudinal guide 20.

The flanges 311 are connected to a central portion 313 of the slider body 31.

In one embodiment of the present invention, the central portion 313 of the slider body 31 is formed spaced from the flanges 311 by a distance d along a vertical direction of the scoring slider 30 (in use). For example, the flanges 311 are parallel to the central portion 313 of the slider body 31 but lie on a plane with a distance d from a plane on which the central portion 313 lies. The flanges 311 are coupled to the central body by means of connecting walls 314, which are preferably inclined.

Figure 3:
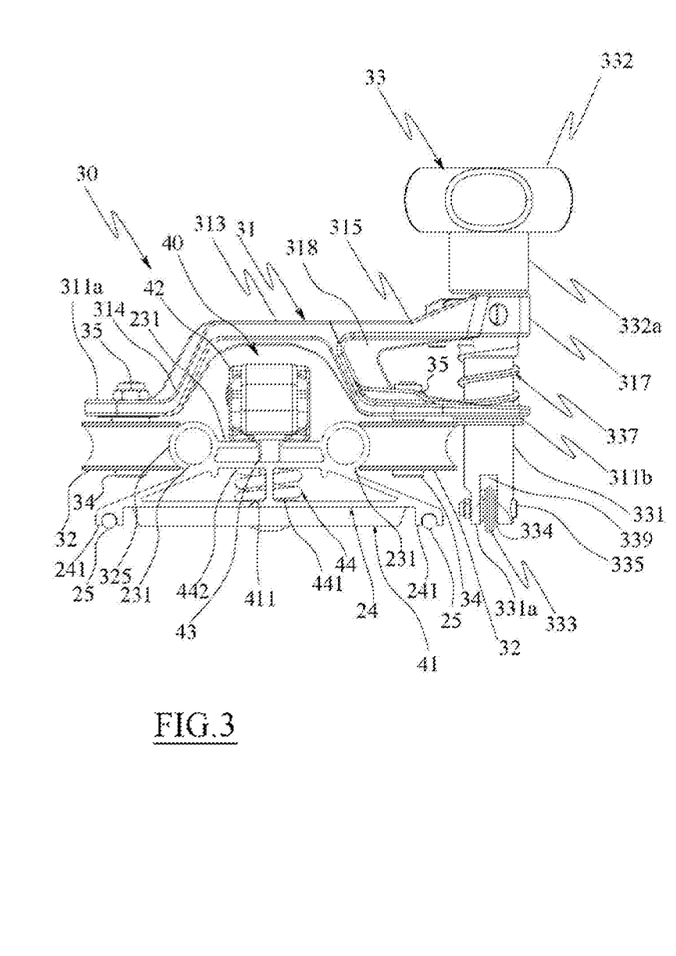
FIG. 3 is a front view of the cutting system of FIG. 1.
Figure 4:
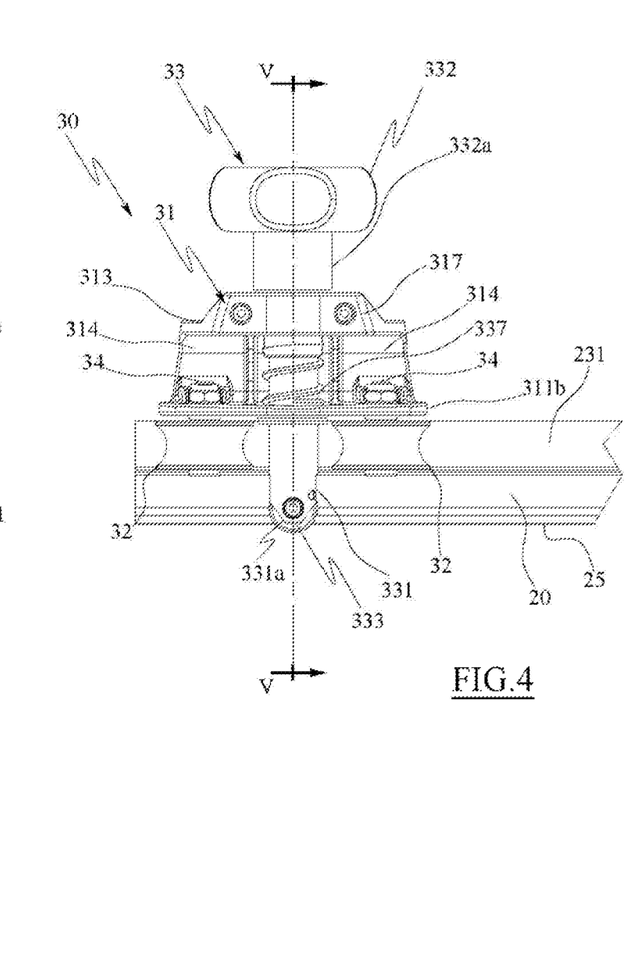
FIG. 4 is a side view of the cutting system of FIG. 3.
Figures 5, 6:
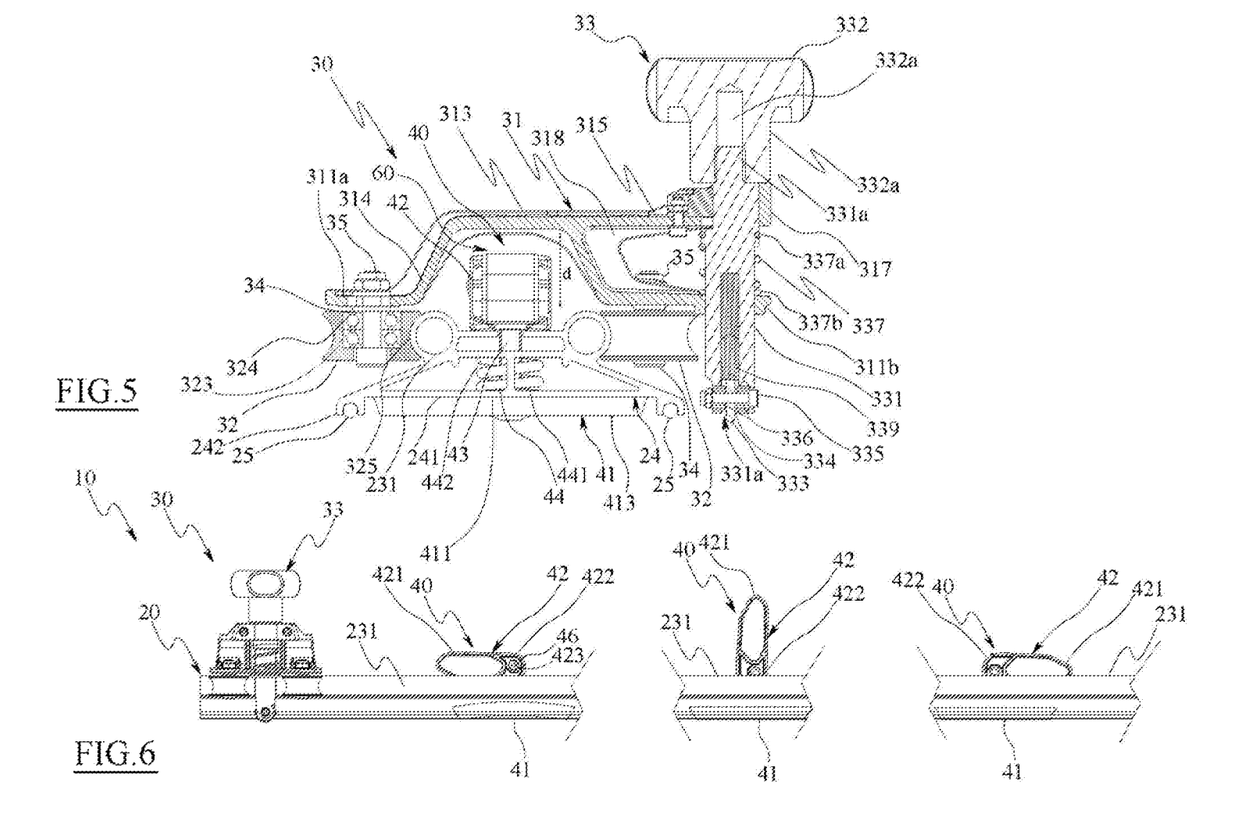
FIG. 5 is a cross-sectional view of a scoring slider of the cutting system of FIG. 4 along the section track V-V of FIG. 4.
FIG. 6 is a side view of parts removed from the cutting system in accordance with an embodiment of the present invention in which an engaged position, an intermediate position and a release position of an actuation lever are shown.

This structure of the slider body 31 defines an arched, or bridge-shaped profile, such that the slider body 31 defines an opening 60 when the scoring slider 30 is coupled to the longitudinal guide 20 (as can be better appreciated in FIGS. 3 and 5). The opening 60 is suitable to receive (with abundant clearance) the lever 42 of the gripping component 40 in its engaged position I or in its released position R. This allows the scoring slider 30 to slide along the longitudinal guide 20 without being hindered by the lever 42 of the gripping components 40 arranged along the longitudinal guide 20, i.e. it passing above them and them passing through it each time.

The slider body 31 further comprises an upper flange 315 formed as at least partially overlapping one of the flanges 311 in plan view, the flange 311b in the example in the Figures, and spaced apart from the same along the vertical direction. For example, flange 315 extends from the central portion 313 of the slider body 31 coplanar therewith. In this way, the upper flange 315 is separated from the flange 311b below by a distance d.

The upper flange 315 and the flange 311b respectively comprise coupling arrangements to allow operational coupling between the slider body 31 and the scoring component 33 (described below). For example, flange 311b comprises a through hole 316 suitable to slidably receive a rod 331 of the scoring component 33 (as will be better described below), while a closing system 317 is associated with the upper flange 315. Advantageously, the closing system 317 slidably receives the rod 331 of the scoring component 33.

Preferably, the slider body 31 may comprise structural reinforcing elements, such as ribs 318. Even more preferably, the central portion 313, the flanges 311 and the upper flange 315 are formed as a single part, e.g., in metal (such as steel) or plastic material.

Each roller 32 comprises a roller body 322 having a hole 323 suitable to rotatably receive a corresponding rotation pin 34.

In one embodiment of the present invention, the roller body 322 has a substantially concavely shaped rolling surface 325. Preferably, this concavely shaped profile substantially corresponds (in a complementary manner) to a form of the rails 231. Even more preferably, the roller body 322 has a substantially cylindrical structure with the rolling surface corresponding (in a complementary manner) to a side surface of the cylinder.

Advantageously, the hole 323 of the roller body 322 is sized to house ball bearings 324 coaxial with the rotation pin 321 in order to obtain idle rollers 32.

In one embodiment, the free end 341 of each rotation pin 34 is at least partially threaded so as to couple to a constraint element 35, such as, for example, one or more nuts and, preferably, washers, once the rotation pin 34 is inserted in the through hole 312, in such a way as to keep the roller 32 rotatably coupled to the slider body 31.

The scoring component 33 comprises, therefore, the aforementioned rod 331 a handgrip 332 connected to a (first) end 331a of the rod 331, while at an opposite (second) end 331b of the rod 331 a scoring wheel 333 is rotatably coupled.

The rod 331 is arranged with its longitudinal axis orthogonal to the contact plane of the suction cups 41 (on the visible surface of the slab 50), in such a way that the (first) end 331a of the rod 331 is distal from such contact plane with respect to the (second) end 331b of the rod 331.

The rotation axis of the scoring wheel 333 is substantially orthogonal to the median plane of the suction cups orthogonal to the lower surface of the longitudinal guide 20 and parallel to the longitudinal axis of the longitudinal guide 20.

Preferably, the handgrip 332 comprises a neck 332a in which a hole 332b suitable to receive the first end 331a of the rod 331 is drilled. For example, the first end 331a of the rod 331 and the hole 332b in the handgrip 332 are designed for snap coupling, or else threaded compatibly in order to allow screwing the handgrip 332 into the rod 331.

Otherwise, the second end 331b comprises an indentation 334 suitable to partially receive the cutting wheel 333 (e.g., half of the cutting wheel 333).

The scoring wheel 333 is coupled to the second end 331b of the rod 331 by means of a wheel pin 335 (e.g., a nut and bolt) inserted in a pair of through holes 336 coaxially formed on opposite portions of the second end 331b of the rod 331 and in a through hole 333a formed substantially in the centre of the scoring wheel 333.

In addition, the scoring component 33 comprises a spring 337, preferably a helicoidal spring. Preferably, an upper end 337a of the spring 337 is rigidly coupled to the rod 331, while an upper end 337b of the spring 337 is abutting against a surface of the flange 311b. Preferably, the spring 337 is arranged coaxially with the rod 331, specifically with the rod 331 being surrounded by the coils of the spring 337.

In this way, the spring 337 is compressed during a downwards movement of the rod 331, specifically when an operator (not illustrated) exerts a pressure on the handgrip 332 to bring the scoring wheel 333 into contact with the slab 50, while the spring 337 returns to the rest position thanks to an upwards movement of the rod 331, particularly when the pressure on the scoring component 33 ceases, moving (and detaching) the scoring wheel 333 away from the slab 50.

In one embodiment of the present invention, the rod 331 comprises a hole 338 formed proximate the lower end 331b of the rod 331, and extending inside the same in the longitudinal direction. Inside the hole 338 a cleaning element 339 is arranged (e.g., made from an elastomeric material or a foam material such as polyurethane) in such a way as to come into contact with the portion of the scoring wheel 333 in the indentation 334. Preferably, the cleaning element 339 is suitable to be moistened with a lubricant (e.g., oil).

In view of the foregoing, the operation of the cutting system 10 is as follows.

In use, the longitudinal guide 20 is positioned on a slab to be cut; the gripping components 40 are operated in order to constrain the longitudinal guide 20 to the (visible) surface of the slab 50, and the scoring slider 30 is slid along the longitudinal guide 20 in order to create a cutting line L on the slab.

Specifically, once the longitudinal guide 20 has been positioned on the slab 50 along the direction of cut desired, each lever 42 of the gripping components 40 is rotated from the release position R to the engaged position I, thus switching the corresponding suction cup 41 from the rest position to the gripping position. In this way, a central region of the suction cup 41 is moved away from the visible surface of the slab 50 while a perimeter edge of the lower surface 413 of the suction cup 41 remains in contact with the same and de facto defines the planar contact surface of the suction cup 41 itself.

As a consequence, the suction cup 41 of the gripping component 40 defines a negative pressure chamber with the visible surface of the slab 50 in the gripping condition, which keeps the longitudinal guide 20 firmly constrained to the slab 50.

The scoring slider 30 can be associated with the longitudinal guide 20 by inserting the slider from one of the ends of the longitudinal guide 20, causing the rollers 32 of the scoring slider 30 to rotate on an external portion (i.e., opposite to the support portion 233) of the rails 231 of the longitudinal guide 20. Preferably, the position of the roller 32 coupled to the flange 311a can be adjusted in order to obtain optimum adherence between the rolling surface 325 of the rollers 32 and the rails 231.

Alternatively, the scoring slider 30 can be coupled to the longitudinal guide 20 in any position of the same by positioning the roller 32 adjustable on the flange 311a at a maximum distance from the rollers 32 on the flange 311b, thus coupling the rollers 32 on the flange 311b to a corresponding rail 231 and, finally, adjusting the distance of the roller 32 on the flange 311a in such a way as to achieve optimum adherence between the rolling surfaces 325 of the rollers 32 and the rails 231.

Once the cutting system 10 has been coupled to the slab 50 as described above, it is possible to perform the scoring operation on the slab 50. In detail, the operator applies pressure on the handgrip 332 of the scoring component 33, in so doing bringing the scoring wheel 333 into contact with the slab 50. At the same time, the operator pushes the scoring slider 30 along the longitudinal guide 20 for a desired length, causing the rollers 32 to rotate along the rails 231. As a consequence, the scoring wheel 333 scores a (rectilinear) cutting line 51 on the slab 50 which allows a subsequent clean and precise cut of the slab 50, e.g., by causing the propagation of the (brittle) fracture from the cutting line 51 through the entire thickness of the slab 50.

Specifically, thanks to the suction cups 41 of the gripping components 40 substantially arranged along the median plane A-A' of the longitudinal guide 20—preferably lying in the median plane of the suction cups 41—and the rails 231 arranged on opposite sides with respect to the median axis A-A', it is possible to limit or even cancel out an inclination/deformation of the longitudinal guide 20 (due to the torque caused by the thrust applied by the operator to the handgrip 332 and by the constraint reaction exerted by the suction cups 41) during the scoring operation just described performed on the slab 50, thus allowing the creation of a precise cutting line 51.

Indeed, greater stability in the face of mechanical stresses is achieved by means of the coupling between the rails 231 of the longitudinal guide 20 and the rollers 32 of the scoring slider 30 along axes parallel to the median axis A-A' of the longitudinal guide 20, along which the suction cups 41 of the gripping components 40 are arranged.

Advantageously, the coupling between the scoring slider 30 and the longitudinal guide 20, in which the scoring slider 30 engages with one or more of its rollers 32 one of the rails 231 and with another one or more of its rollers 32 the other rail 231 (simultaneously), allows to distribute the mechanical stresses throughout the structure of the longitudinal guide 20 in a substantially uniform manner, inasmuch as the rails 231 are arranged on opposite sides with respect to the median plane A-A' of each suction cup (common to all suction cups 41) which is perpendicular to the contact surface of the suction cup 41 on the slab 50 and parallel to the longitudinal direction L of the longitudinal guide 20.

Specifically, the arched structure of the slider body 31 and the structure of the gripping components 40, according to embodiments of the present invention, allows the rollers 32 of the scoring slider 30 to roll along the rails 231 of the longitudinal guide 20 overlapping the suction cups 41 of the gripping components 40 without interruptions or obstacles in their path during the scoring operation thanks to the opening 60 sized to avoid contact between the levers 42 of the gripping components 40 and the slider body 31 of the scoring slider 30.

One of skill in the art will appreciate that the structure of the cutting system 10, according to embodiments of the present invention, allows to move the scoring slider 30 along the longitudinal guide 20 even in the event that none, or only some, of the gripping components 40 are in the gripping position. This allows to finely adjust and check the position of the cutting system 10 on the slab 50 before carrying out the scoring operation, and allows to perform changes in positioning of the cutting guide 10 on the slab 50, e.g. by giving the operator the ability to make scoring portions in different directions (i.e., to define split scoring lines or preparatory and preliminary scoring lines to any measurement checks).

Moreover, the cutting system 10 according to embodiments of the present invention is extremely compact and can be constrained to the slab 50 with an extremely limited encumbrance thereon.

Figures 7, 8:
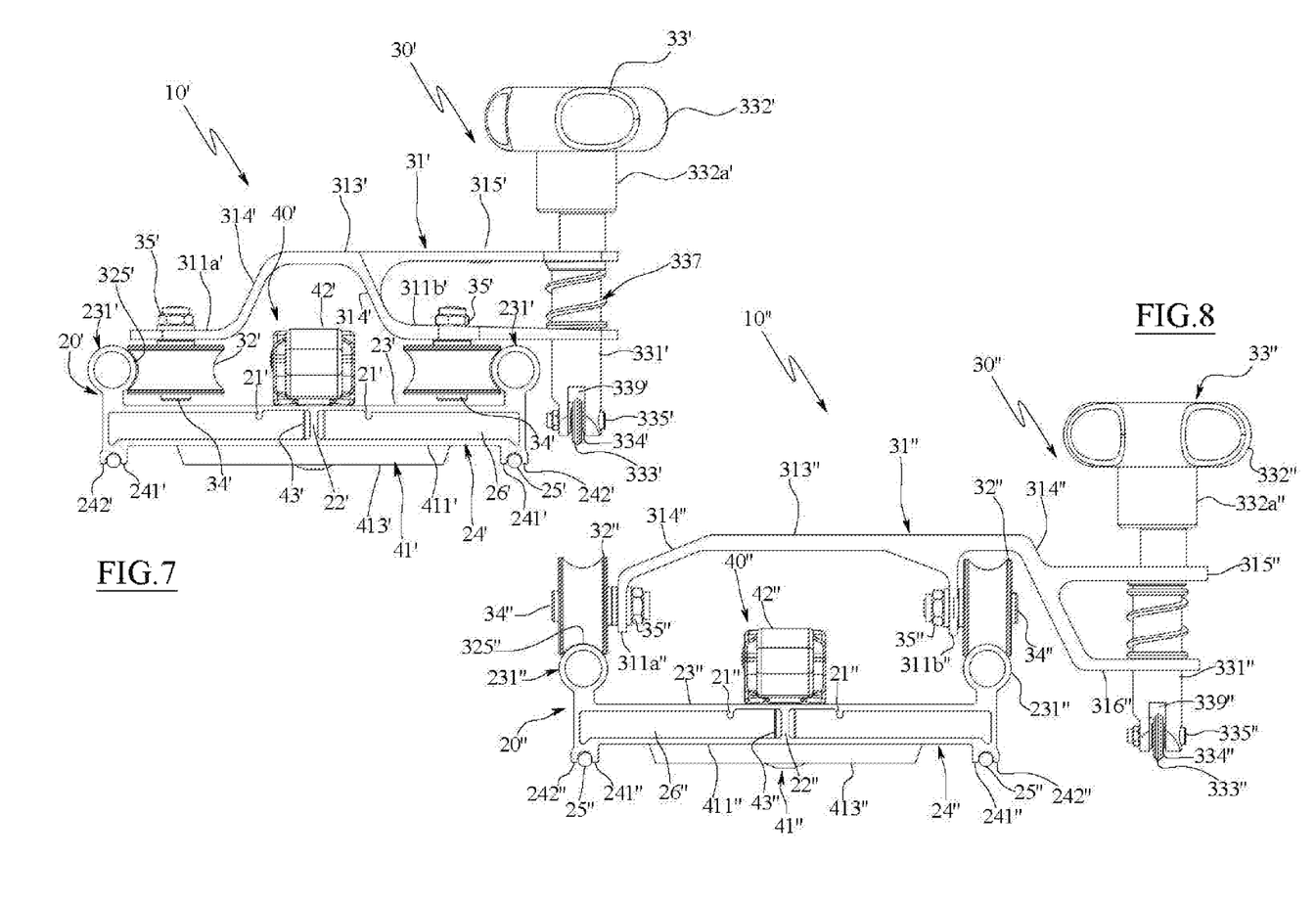
FIG. 7 is a front view of a cutting system according to a first alternative embodiment of the present invention.
FIG. 8 is a front view of the cutting system according to a second alternative embodiment.

Now moving to FIG. 7, this is a front view of a cutting system 10' according to a first alternative embodiment of the present invention.

The cutting system 10' differs from the cutting system 10 described above only in the following, where like reference numbers indicate like components.

The longitudinal guide 20' has a substantially rectangular lateral profile and is also free of support portions (such as the support portions 233 described above). As a consequence, the lever 42' of the gripping component 40' lies directly on the upper surface 23' of the longitudinal guide 20'.

Moreover, the scoring slider 30' comprises a slider body 31' designed to associate the rollers 32' of the scoring slider 30' with an internal portion of the rails 231' of the longitudinal guide 20'. In other words, the rollers 32' are slidably coupled to the rails 231' on a plane defined by the rails and internal to a region of the plane delimited by the same.

In other words, in which the rollers 32' each have a revolution axis orthogonal to the lower surface 24' of the longitudinal guide 20', and are suitable to roll on the respective rail 231' from mutually facing sides thereof.

FIG. 8 is a front view of the cutting system 10" in accordance with a second alternative embodiment.

The cutting system 10" differs from the cutting system 10 described above in the following, where like reference numbers indicate like components.

Also in this case, the longitudinal guide 20" has a substantially rectangular lateral profile and is also free of support portions (such as the support portions 233 described above). As a consequence, the lever 42" of the gripping component 40" lies directly on the upper surface 23" of the longitudinal guide 20".

Moreover, the scoring slider 30" comprises a slider body 31" designed to associate the rollers 32" of the scoring slider 30" with an upper portion of the rails 23" of the longitudinal guide 20" (when arranged in an operational position).

For example, the flanges 311a" and 311b" of the slider body 31" are transverse with respect to the lower plane 24" of the longitudinal guide 20". Moreover, an auxiliary flange 316" develops from an oblique portion 314" of the slider body 31" parallel to the upper flange 315" and beneath the same. The upper flange 315" and the auxiliary flange 316" comprise respective coupling arrangements to allow an operational coupling between the slider body 31" and the scoring component 33".

With this structure, the rollers 32" are slidably coupled to the rails 231" transversely (preferably, perpendicularly) to a plane defined by the same.

In other words, the rollers 32" each have a revolution axis parallel to the lower surface 24" of the longitudinal guide 20" and orthogonal to the said median plane of the suction cups, and are suitable to roll on the respective rail 231" from the side thereof opposite to the lower surface 24".

The invention thus conceived is susceptible of numerous modifications and variations, all of which are within the scope of the inventive concept.

Furthermore all details may be replaced by other technically equivalent elements.

For example, in one alternative embodiment of the present invention, the rollers of the scoring slider may be replaced by two or more runners.

In a further alternative embodiment, the pair of rails may be replaced by a single rail or similar sliding element. For example, the longitudinal guide may comprise a single rail of circular, elliptical (or other equivalent shape) section having a median plane aligned with the median plane of the suction cups. At the same time, the rollers are shaped in such a way as to obtain a rolling surface suitable for rotatably coupling to opposite portions of a surface of the rail.

In practice, the materials used, as well as the contingent shapes and dimensions, may be any according to requirements without thereby departing from the scope of protection of the following claims.

For example, although the longitudinal guide may be simply and economically created from a single piece via the extrusion of a suitable material, such as a metal (steel, aluminium etc.) or polymer, nothing prevents the longitudinal guide being made up of separate, mechanically connected elements, or components welded together at a later time.

The invention claimed is:

1. A manual cutting system for slabs comprising:
   a scoring slider;
   a longitudinal guide constituted by a single longitudinal bar comprising a pair of surfaces opposite to each other, the pair of surfaces comprising a lower surface and an opposite upper surface, the opposite upper surface comprising a pair of rails parallel to each other, the scoring slider being slidably coupled to the pair of rails;
   at least one suction cup rigidly engaged with the lower surface of the longitudinal guide, and configured to selectively adhere to a slab, and defining a planar contact surface for the longitudinal guide on the slab,
   at least one gripping component engaged with the upper surface of the longitudinal guide between the pair of rails and coupled to a respective one of the at least one suction cup, for manually operating the at least one suction cup between a slab gripping condition, in which the at least one suction cup adheres to the slab, and a slab rest condition, in which the at least one suction cup releases the slab;
   wherein the rails are arranged on opposite sides with respect to a median plane passing through the at least one suction cup perpendicular to the contact surface of the at least one suction cup,
   wherein the median plane is parallel to a longitudinal axis of the longitudinal guide; and
   wherein the scoring slider comprises a slider body, at least two rollers coupled with the pair of rails of the longitudinal guide, and a scoring component, wherein the scoring component comprises a scoring wheel rotatable about a rotation axis orthogonal to the median plane of the at least one suction cup.

2. The cutting system according to claim 1, wherein the rails are parallel to the median plane of the at least one suction cup parallel to a longitudinal axis of the longitudinal guide.

3. The cutting system according to claim 1, wherein the at least one gripping component comprises a lever configured and operable to switch the respective one of the at least one suction cup from the slab gripping condition to the slab rest condition in which said lever releases the slab, said lever being exposed on the upper surface of the longitudinal guide between the parallel rails.

4. The cutting system according to claim 3, wherein the lever of the at least one gripping component is rotatable from an engagement position, that imposes the gripping condition of the respective one of the at least one suction cup, to a release position, which imposes the rest condition of the respective one of the at least one suction cup, the lever in the engagement position and in the release position being parallel to the longitudinal guide.

5. The cutting system according to claim 1, wherein:
   the scoring component is configured and operable to score the slab, and
   the slider body is coupled to the at least two rollers and to the scoring component.

6. The cutting system according to claim 5, wherein the slider body defines an opening when the scoring slider is coupled to the rails by the at least two rollers, the opening being configured to receive a lever of the at least one gripping component comprising the at least one suction cup, when the lever is in an engagement position or in a release position thereof, during the sliding of the scoring slider along the longitudinal guide.

7. The cutting system according to claim 5, wherein the slider body comprises two flanges spaced apart from each other, each flange being suitable for coupling to at least one roller and wherein at least one flange allows to adjust a coupling position of a roller in a direction that connects the two flanges.

8. The cutting system according to claim 5, wherein the scoring component of the scoring slider further comprises:
   a handgrip,
   a rod, and
   wherein the scoring wheel is rotatably coupled to a first end of the rod opposite to a second end to which the handgrip is coupled, and
   wherein the rod comprises a hole at the first end and wherein a cleaning and/or lubricating element is placed in the hole, the cleaning and/or lubricating element contacting a portion of the scoring wheel facing the rod in order to remove foreign bodies present on said portion of the scoring wheel and/or release a lubricant substance onto the scoring wheel.

9. The cutting system according to claim 5, wherein the at least two rollers each have a revolution axis orthogonal to the lower surface of the longitudinal guide and are configured and operable to roll on the corresponding rail from opposite sides thereof.

10. The cutting system according to claim 5, wherein the at least two rollers each have a revolution axis orthogonal to the lower surface of the longitudinal guide and are configured and operable to roll on the corresponding rail from mutually facing sides thereof.

11. The cutting system according to claim 5, wherein the at least two rollers each have a revolution axis parallel to the lower surface of the longitudinal guide and orthogonal to the said median plane of the at least one suction cup and are configured and operable to roll on the respective rail from the side thereof opposite to the lower surface.

12. The cutting system according to claim 1, wherein the at least one gripping component comprises a lever operable to switch the respective one of the suction cup from the slab gripping condition to the slab rest condition in which said lever releases the slab, said lever being exposed on the upper surface of the longitudinal guide between the parallel rails, and wherein the lever of the at least one gripping component is rotatable from an engagement position, that imposes the gripping condition of the respective one of the suction cup, to a release position, which imposes the rest condition of the respective one of the suction cup, the lever in the engagement position and in the release position being parallel to the longitudinal guide.

13. A manual cutting system for slabs comprising:

a scoring slider;

a longitudinal guide constituted by a single longitudinal bar comprising a pair of surfaces opposite to each other, the pair of surfaces comprising a lower surface and an opposite upper surface, the opposite upper surface comprising a pair of rails parallel to each other, the scoring slider being slidably coupled to the pair of rails;

at least one suction cup engaged with the lower surface of the longitudinal guide, and configured to selectively adhere to a slab, and defining a planar contact surface for the longitudinal guide on the slab, a gripping component engaged with the upper surface of the longitudinal guide, for manually operating the at least one suction cup between a slab gripping condition, in which the at least one suction cup adheres to the slab, and a slab rest condition, in which the at least one suction cup releases the slab;

wherein the rails are arranged on opposite sides with respect to a median plane of the at least one suction cup perpendicular to the contact surface of the suction cup, wherein the median plane is parallel to a longitudinal axis of the longitudinal guide; and wherein the scoring slider comprises a slider body, at least two rollers coupled with the pair of rails of the longitudinal guide, and a scoring component, wherein the scoring component comprises a scoring wheel rotatable about a rotation axis orthogonal to the median plane of the at least one suction cup.

* * * * *